Aug. 25, 1959

J. WALEFFE 2,901,163

PRESSURE CONVERTER

Filed July 15, 1954

Inventor:
José Waleffe,
by
Pierce, Scheffler & Parker,
Attorneys.

Aug. 25, 1959    J. WALEFFE    2,901,163
PRESSURE CONVERTER
Filed July 15, 1954    5 Sheets-Sheet 4

Aug. 25, 1959     J. WALEFFE     2,901,163
PRESSURE CONVERTER

Filed July 15, 1954                         5 Sheets—Sheet 5

United States Patent Office 2,901,163
Patented Aug. 25, 1959

2,901,163

PRESSURE CONVERTER

José Waleffe, Baden, Switzerland, assignor to Aktiengesellschaft Brown, Boveri & Cie, Baden, Switzerland, a joint-stock company Application July 15, 1954, Serial No. 443,686

Claims priority, application Switzerland July 29, 1953

7 Claims. (Cl. 230—69)

This invention relates to a pressure converter of the type including a cylindrical array of cells and control elements for regulating the flow of gaseous fluids into and out of the cells, the cells and regulating elements being supported for relative rotation.

A "pressure-exchanger" is a machine which takes in a compressible working-fluid at a low pressure level, compresses it with the aid of compression waves, and then delivers this fluid at a higher pressure level, while at the same time the machine expands a different working-fluid, or the same fluid in a modified condition and in different quantity, from a high to a low pressure level with the aid of expansion waves. The compression and expansion waves respectively are developed in oblong cells into which the working-fluid is introduced and discharged in sequence by control elements arranged adjacent to the ends of the cells. Either the cells are mobile being arranged for instance on a revolving shaft, and the control elements are stationary in a casing surrounding the shaft, or vice versa, the cells can be stationary and the control elements mobile. There is a time interval provided for both pressure stages during which one working fluid displaces the other from the cells. Consequently, the upper pressure values as well as the lower pressure values of the expanding working-fluid and of the working-fluid to be compressed are both equal within the respective cells, with the exception of insignificant differences caused by losses incurred during the flow of the working-fluids and by dynamic pressures.

The uniformity of the pressure values of both workingfluids, at the upper as well as the lower pressure cells or stages, limits the usefulness of the pressure-exchanger in many ways and prevents its practical use in many instances. Objects of the invention are to remove this disadvantage and provide a machine having an arrangement of cells in which not only each individual pressure within four intake and outlet pressure stages of two workingfluids can be entirely different, within practical limits, but in which more than two working-fluids can be compressed or expanded at still different—or equal—stages of pressure. Such a generally usable machine, to distinguish it from the known "pressure exchanger" with its limited usefulness will be termed a "pressure converter."

An object of the invention is therefore to provide a pressure converter for compression of at least one working-fluid from a lower pressure stage to a higher pressure stage by means of expansion of at least one workingfluid from a higher to a lower pressure stage; the machine being characterized by a plurality of cells with control elements at both ends to connect the cells successively with at least four chambers from which, or into which, the working-fluids flow, and where such connection between a cell in which previously introduced fluid is present at a certain pressure and a chamber at a different pressure stage will bring about the formation of a pressure wave which will traverse the cell and set its contents in motion to effect a transfer of working-fluid between the cell and the chamber; the control elements operating to re-seal the connection between the cells and the chambers not later than at the instant when the next-following and oppositely moving pressure wave arrives at that end of the cell at which the first wave had formed.

These and other objects and the advantages of the invention will be apparent from the following specification when taken with the accompanying drawings in which.

Figure 1A:
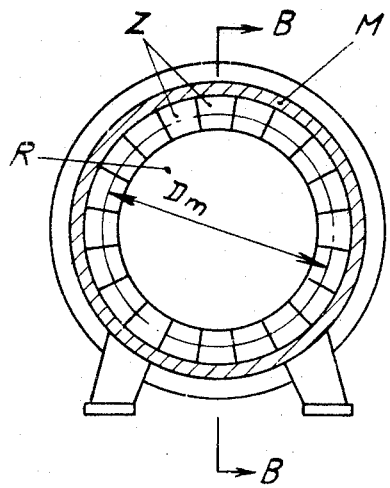
Fig. 1a is a transverse section, on line A—A of Fig. 1b, of a pressure converter embodying the invention and in which the cells are parallel to the axis of their supporting shaft.
Figure 1B:
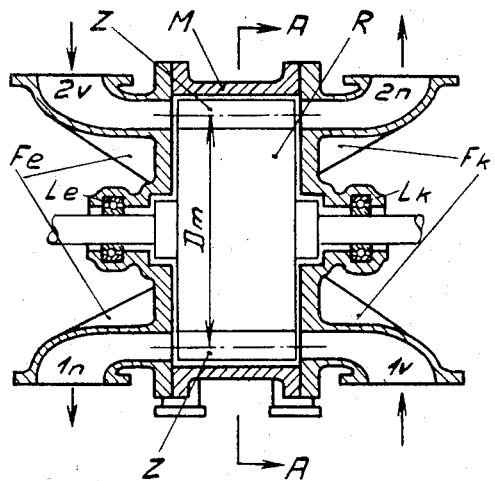
Fig. 1b is an axial section, on line B—B of Fig. 1a, of the pressure converter.

As shown in Figs. 1a and 1b, the pressure converter comprises a rotor R having a cylindrical array of cells Z of a mean diameter $D_m$ at its periphery, and apertured control members $F_e$, $F_k$ at the ends of the rotor and cooperating with cylindrical shell M to form a casing for the rotor. Pipe connections for the intake and discharge of the working-fluids are made to chambers in the side walls, the chambers being identified by reference characters $1v$, $2v$, $1n$ and $2n$ according to the system that numeral 1 indicates a lower pressure level and numeral 2 a higher pressure level, and letter $v$ indicates a transfer of fluid from a chamber to the cells and letter $n$ indicates a discharge of fluid from the cells into the chamber. The reference characters applied to the different chambers thus have the following significance:

$1v$ is a chamber for the introduction of a working-fluid to be compressed;

$2v$ is a chamber for the introduction of a working-fluid to be expanded;

1n is a chamber for the exhaust of expanded working-fluid; and 2n is a chamber for the exhaust of a compressed working-fluid.

In the illustrated practical embodiment of the invention, the shaft of rotor R is supported in bearings L$e$ and L$k$ mounted in the side walls F$e$ and F$k$ but it is to be understood that the cell assembly may be the stationary element of the pressure converter when the control elements are mounted for rotation. While the illustrated cells Z are each parallel to the axis of rotor R, they could be of helical form and the openings in the control elements may be so shaped that fluid enters and leaves the cells either parallel to or at an angle to the rotor axis.

Figure 2:
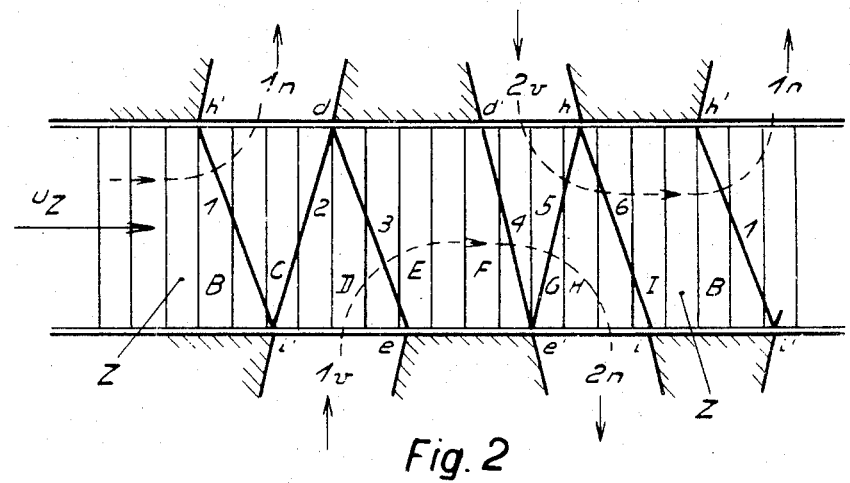
Fig. 2 is a linear development of a section through the cells and control elements of one embodiment of the invention on a cylindrical surface passing through the centers of the cells.

In the Fig. 2 development, the walls of the cells Z appear as straight lines at right angles to their direction of movement from left to right, as indicated by the arrow U$_z$, at constant velocity. The control elements have openings $h'$—$d$, $d'$—$h$, $i'$—$e$, $e'$—$i$ between corresponding solid portions $d$—$d'$, $h$—$h'$, $e$—$e'$, $i$—$i'$. Each individual cell Z in turn moves past the control edges $h'$, $i'$, $e$, $d'$, $e'$, $h$ and $i$, to complete a working cycle and it is advantageous to provide such number of cells on the rotor R that each revolution produces a plurality of working cycles. The establishment of a connection between a cell and a chamber will, because of the existing difference in pressure, always cause the formation of a pressure wave which traverses the cell and sets its contents in motion in the manner described in the following paragraph. It is obvious that the revolution of the shaft will cause the formation of identical waves in each particular cell and it will therefore suffice to follow the movements of only one of the cells on its way past the control openings in order to understand the method of operation of this arrangement.

Figure 2 shows one practical construction which develops a total of six waves during each working cycle. The contents of cell Z of Fig. 2 are practically at rest within the cell, and are at a certain pressure level when this cell is rotated into the position B at which its upper end is brought into communication with chamber 1$n$ of the upper control element, this chamber containing fluid at a lower pressure level than that within cell Z. An expansion wave will therefore form at this end of the cell and traverse it; its course between the control elements being represented by the straight line 1. A part of the cell contents enters the chamber 1$n$ and the cell Z arrives in position C at the instant when wave 1 arrives at the lower control element and simultaneously this lower end of cell Z is brought into communication with chamber 1$v$, where a lower pressure exists than in the cell after wave 1 has traversed it. The cell contents which move from the bottom toward the top, as viewed in Fig. 2, constitute a substance with a specific kinetic energy and hence "suck in," at this bottom end of the cell, the gaseous medium existing in chamber 1$v$ in cases where the pressure in chamber 1$v$ is lower than that at the adjacent end of the cell at position C. Therefore another expansion wave develops at this bottom end of the cell, the course of which is represented by the straight line 2. Furthermore, working-fluid from chamber 1$v$ enters the cell. In position D at the instant when wave 2 reaches the upper control element this upper cell end is sealed by the control element face $d$—$d'$. Now a compression wave 3 develops at this point and in its wake the contents of the cell come practically to a standstill but at a higher pressure than before. When the cell reaches position E at the instant when wave 3 arrives at the lower end of the cell, this end is sealed by the lower control element face $e$—$e'$, but no new wave originates here because in the wake of wave 3 the contents of the cell have practically come to a standstill, an effect caused by the sealing of the cell. The term: "at the instant" when one wave reaches one end of a cell, can be defined as the short period of time which elapses while one cell moves past a control edge.

In position F the cell is brought into communication with chamber 2$v$ in which the fluid pressure exceeds that in the cell Z after wave 3 has traversed it. At this point a compression wave 4 is formed and working-fluid enters the cell from chamber 2$v$. In position G at the instant when wave 4 reaches the lower end of the cell, the cell is connected with chamber 2$n$ where a higher pressure exists than in the cell after wave 4 has traversed it. A compression wave 5 forms now and at this point which discharges a part of the cell contents into chamber 2$n$. At position H, at the instant when wave 5 reaches the upper control element, the cell is sealed by the upper element face $h$—$h'$, and an expansion wave 6 is formed, and in its wake the contents of the cell come practically to a standstill, and at a lower pressure than before. At position I this wave reaches the lower end of the cell at the instant it is sealed by the lower control element face $i$—$i'$, but no new wave develops since, exactly as in position E, the cell contents are substantially stationary. The pressure of the cell contents is now again at the same level as at the beginning of the working cycle, and the cycle begins anew.

The above described arrangement of the control elements in relation to the cells has the effect that the control elements break the connection of each individual cell and the intake and outlet chambers not later than at the instant when a next-following wave (which has formed at the opposite end of the cell) arrives at that end of the cell where the first wave originated. This arrangement has the effect that one working-fluid, which enters the cells at a certain pressure, for example that of chamber 1$v$, and leaves the cells at a different pressure, for example that of chamber 2$n$, is being compressed, while at the same time another working-fluid which enters at the pressure of chamber 2$v$ and leaves at the pressure level of chamber 1$n$ is being expanded, and that all these pressure values may be different from each other. The working-fluids are transferred as shown by the dotted lines either from chamber 1$v$ to chamber 2$n$ or from chamber 2$v$ to chamber 1$n$ in the manner described above, namely by first entering part way into the cells, coming to a standstill in the cells, and at last leaving them again.

In order to achieve a closed working cycle, it is necessary that the waves 2 and 5 generate opposite pressure differences; therefore, if wave 2 is an expansion wave, as above described example, wave 5 must be a compression wave; and vice versa, if wave 2 is a compression wave, wave 5 must be an expansion wave.

The pressure difference between chamber 1$v$ and chamber 1$n$ depends not only on dynamic pressures and pressure losses in the cells and the intake and outlet chambers, but also on the amplitude of wave 2. Likewise, the pressure difference between chamber 2$v$ and chamber 1$n$ depends not only on dynamic pressures and pressure losses but upon the amplitude of wave 5.

It is preferable to make the circumferential lengths of the solid portions $d$—$d'$, $e$—$e'$, $h$—$h'$ and $i$—$i'$ of the control elements at least equal to the width of one cell in order to prevent any leakage between two adjoining intake and outlet chambers.

The manner of operation of the pressure-converter can be illustrated very clearly by a simplified time-pressure or U–A diagram as shown in Figures 2$a$ and 2$b$, that is by a vector diagram with the non-dimensional magnitudes U and A, which are defined as follows: If $p$ is the pressure of a working-fluid at any one time during the working cycle of the pressure-converter, $a$ the pertinent sonic velocity, $u$ the pertinent velocity of flow of this working-fluid in one or the other direction of cell-axis, $p_0$ any reference pressure and $a_0$ the reference sonic velocity at the pressure $p_0$, then $P=p/p_0$, $A=a/a_0$ and $U=u/a_0$;

these non-dimensional magnitudes which can be plotted on a U–A plane for each changing value of state of the working-fluids. If suitable scales are used, the compressions and expansions of the working-fluids will appear as straight lines at 45 degree angles, following one after the other corresponding to the sequences of the changes of state. In this case the A-axis can also be construed as P-axis.

The changes of state of one working-fluid in one of the cells Z then appear on the U–A diagram of Figure 2a as follows: Prior to the beginning of the working cycle the working-fluid contained in cell Z is at rest and at a certain pressure; this state of the working-fluid is represented by point $A_1$ located on the A-axis. After the expansion wave 1 has traversed the cell, the working-fluid is in the state $1n$, corresponding to the pressure existing in chamber $1n$, that is, it has a pressure corresponding to the $A(=P)$-magnitude of the ordinate at the terminal of line 1, which represents the expansion wave and a certain velocity of flow corresponding to the magnitude and to the direction of the abscissa at the same point. The expansion wave 2, which follows the first wave, changes the working-fluid to the state $1v$ and working-fluid enters the cell from the chamber $1v$. At the terminal point $A_4$ of the compression wave 3, which coincides with the starting point of the next-following compression wave 4, the contents of the cell are again at rest. At the terminal point of wave 4 the state $2v$ is reached and working-fluid enters the cell from chamber $2v$. The compression wave 5 which follows causes working-fluid in the state $2n$ to flow into chamber $2n$ and, finally, expansion wave 6 returns the cell contents to a state corresponding to point $A_1$ on the A-axis and the working cycle begins anew.

Figure 2A:
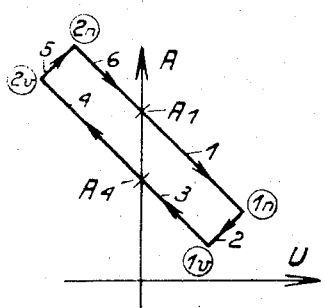
Figs. 2a and 2b are vectorial diagrams illustrating pressure variations in a cell under different operating conditions.
Figure 2B:
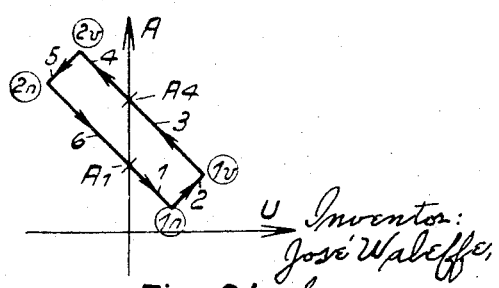

It is now obvious that wave 2, which originates at the terminal point of wave 1, need not necessarily be an expansion wave as shown in Fig. 2a, but could also be a compression wave as shown in Fig. 2b, depending on the circumstance whether the pressure stage of the working-fluid corresponding to the state of $1v$ is lower or higher than the pressure stage corresponding to the state of $1n$. In this case the pressure-converter will function as shown in the diagram of Figure 2b; the control edges of the control openings will be left in exactly the same position as in the case shown by Fig. 2a, but the pressures of the working-fluids are of a different magnitude in the two cases. A comparison of the two diagrams shows clearly that in the case represented by Fig. 2a the pressure jump of the working-fluid to be compressed from $1v$ to $2n$ is greater than the pressure drop of the working-fluid to be expanded between $2v$ and $1n$, while in the case represented by Fig. 2b the pressure ratio is exactly reversed. Furthermore, in the case represented by Fig. 2a the pressure of the working-fluid at the stage $1v$ is lower than the pressure of the working-fluid at stage $1n$, and the pressure of the working-fluid at stage $2n$ is higher than the pressure of the working-fluid at the stage $2v$, while in the case of Fig. 2b this ratio is reversed also. The above given analysis shows that the pressure-converter can be used in relation with various pressure ratios; later on a description will be given of a pressure-converter which will produce other pressure differences.

Figure 3:
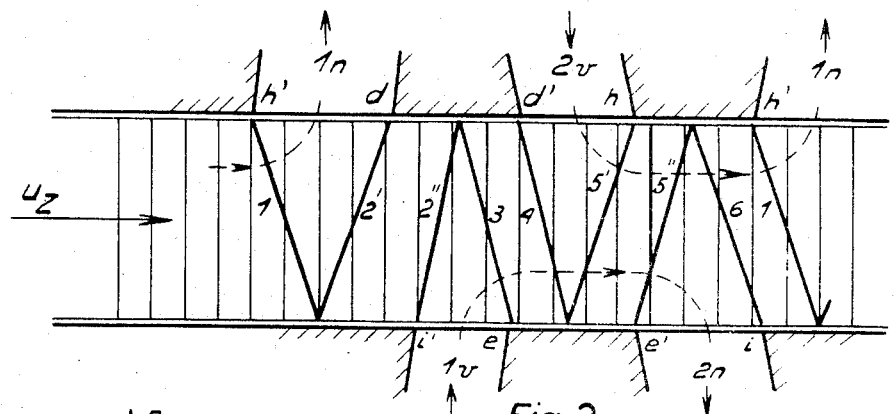
Fig. 3 is a linear development of a cylindrical section through another embodiment of the invention.
Figure 3A:
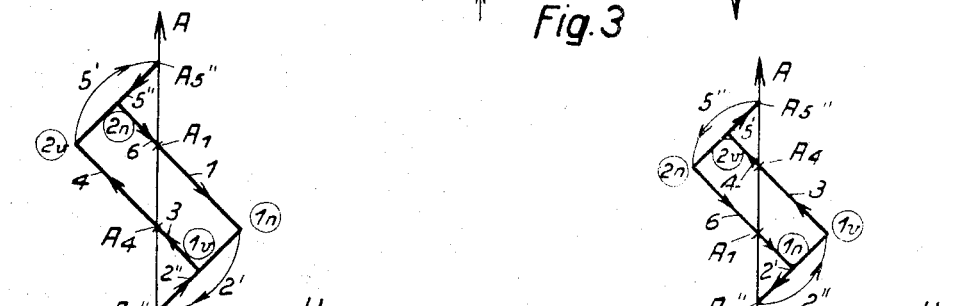
Figs. 3a and 3b are vectorial diagrams illustrating pressure variations in a cell of the Fig. 3 apparatus.
Figure 3B:
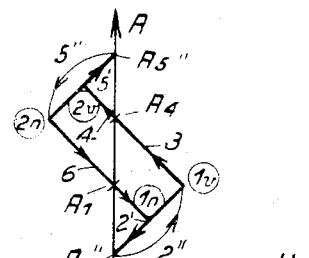

Figure 3 and the associated U–A diagrams of Figs. 3a and 3b show another practical embodiment of the invention and its method of operation. In this apparatus the solid faces $d$—$d'$, $e$—$e'$, $h$—$h'$, and $i$—$i'$ between openings of the control elements are increased in length, for instance for the purpose of ensuring the formation of desired waveform in case of different shaft speed of the machine. With this construction of the pressure-converter a total of eight pressure waves are developed in each working cycle. Wave 2 of the embodiment shown in Figure 2 is replaced by waves 2' and 2" in Figure 2, and these waves, by use of the same symbols, are also shown in Figures 3a and 3b. Wave 2' is again an expansion wave, while 2" is a compression wave. In the same manner wave 5 of Fig. 2 is replaced by waves 5' and 5", 5' being a compression-, and 5" an expansion-wave. Before each of the waves 1, 2", 4 and 5" begins to form, the contents of the cells are at rest; these points being represented in Figs. 3a and 3b by points $A_1$, $A_2''$, $A_4$ and $A_5''$. All four of these waves are reflected at the opposite end of the cell while the cell is still sealed by the control elements. Without describing their derivation in detail, it is to be understood that the A–U charts associated with Fig. 3 and other views hereinafter described are constructed in the same manner as the Figs. 2a and 2b charts, and that the change in pressure condition is in each instance shown by a vector identified by the reference numeral of the pressure wave which produced it.

Figure 4:
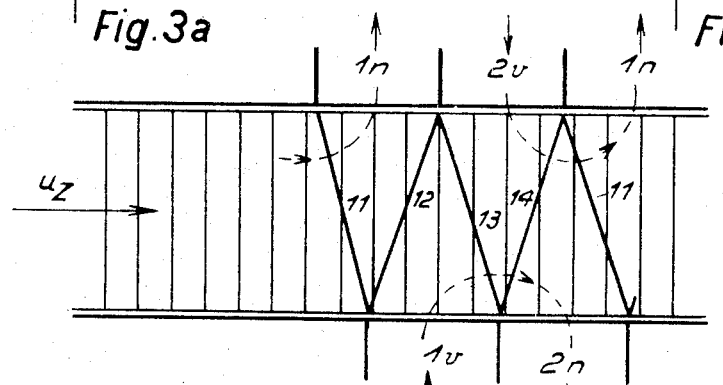
Fig. 4 is a linear development of a cylindrical section through another embodiment of the invention.
Figure 4A:
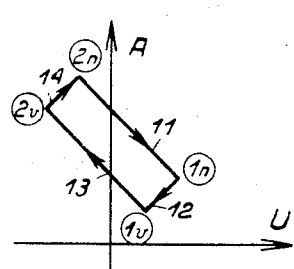
Figs. 4a and 4b are vectorial diagrams illustrating pressure variations in a cell of the Fig. 4 apparatus.
Figure 4B:
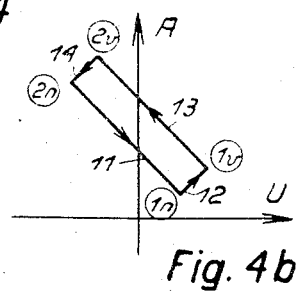

In Figure 4 it is shown how the closed portions of the control elements can be shortened in length to such degree as to approach the value of zero, for instance for the purpose of reducing the size of the machine. This embodiment utilizes four waves in the course of one working cycle. The control openings of the control elements are arranged in such manner that in the course of one working cycle each of the four waves reaches the opposite end of the cells at the instant when this end is being brought in connection with an intake or outlet chamber. Wave 11 as shown in Fig. 4a is an expansion wave and wave 13 is a compression wave. If, as shown in Fig. 4a, wave 12 is an expansion wave, wave 14 must be a compression wave, and if wave 12, as in the case shown in Fig. 4b, is a compression wave, wave 14 must be an expansion wave.

Figure 5:
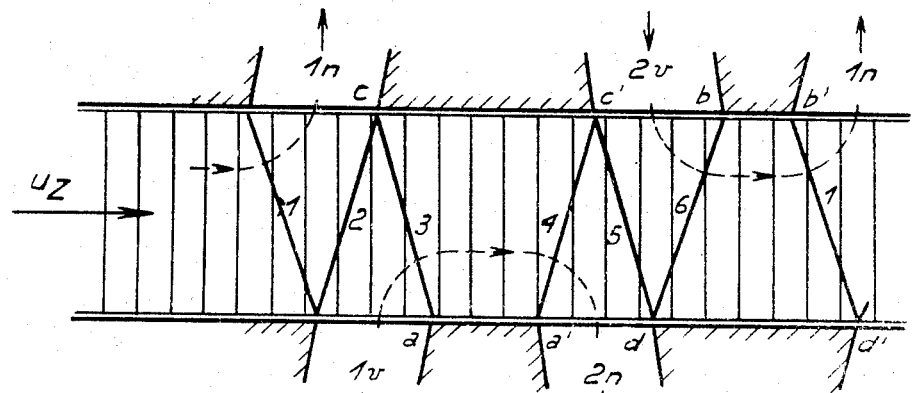
Fig. 5 is a linear development of a cylindrical section through an embodiment of the invention.
Figure 5A:
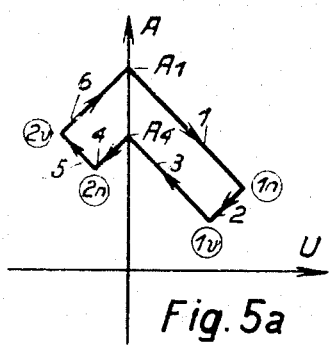
Figs. 5a and 5b are associated vectorial diagrams.
Figure 5B:
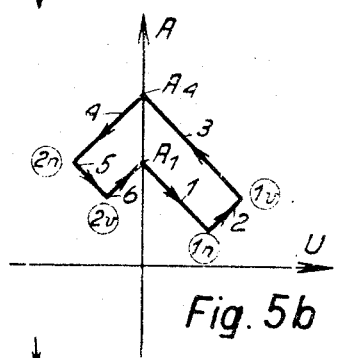

The pressure-converter shown in Fig. 5 and associated Figs. 5a and 5b differs from the pressure-converter shown in Fig. 2 in that respect, that here wave 4 is an expansion-, and wave 6 a compression-wave. The expansion wave 4 causes working-fluid to flow from the cell. Up to a certain amplitude of this wave the working-fluid discharged into chamber $2n$ is at a higher pressure stage than at the time of its entry into the cell from chamber $1v$; consequently, it has been compressed. The working-fluid that enters the cells at chamber $2v$ and leaves them at $1n$ has been expanded. A comparison with Fig. 2 will show that wave 4 of Fig. 5 originates at the lower or opposite end of the cell than that at which wave 5 of Fig. 2 originates. It is necessary, as in the case of Fig. 2, that waves 2 and 5 generate pressure waves opposed to each other. It is possible to increase the length of the relatively opposed solid faces $a$—$a'$ and $b$—$b'$ of the respective elements as shown in Fig. 3, or to reduce the length as shown in Fig. 4; however, the lengths of the solid faces are all interrelated to each other and to the course of pressure waves 3 and 4 with respect to the sealing face of the cell at the ends opposite those at which the waves originate. Contrary to the pressure-converter types shown in Figures 2 to 4, the pressure-converter shown in Figure 5 delivers the compressed working-fluid at $2n$ before the working-fluid to be expanded enters the cells from chamber $2v$. This difference in the operating condition will be apparent from a comparison of the A–U vectors of Figs. 5a and 5b with the vectors of Figs. 2a and 2b respectively.

Figure 6:
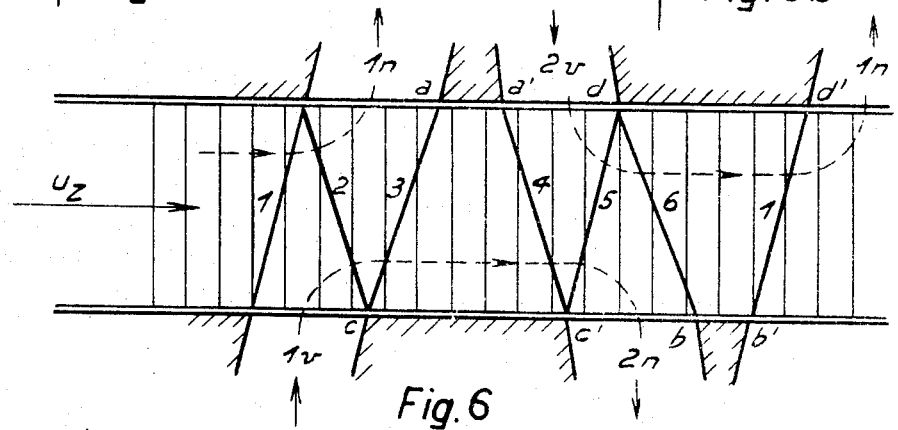
Fig. 6 is a linear development of a cylindrical section through another embodiment.
Figure 6A:
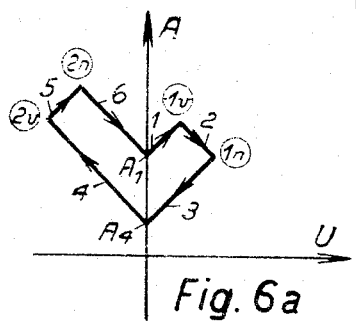
Figs. 6a and 6b are associated vectorial diagrams.
Figure 6B:
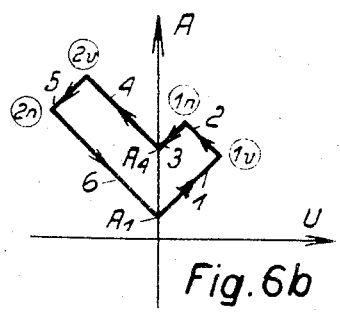

The pressure-converter shown in Figure 6 and associated Figures 6a and 6b first takes in working-fluid to be compressed from chamber $1v$ before it expels the expanded working-fluid into chamber $1n$. Wave 1 is a compression- and wave 3 an expansion-wave; wave 1 causes the working-fluid to enter the cells. Up to a certain amplitude of this wave, the working-fluid entering the cells at $1v$ is at a lower pressure stage than at the time when it leaves the cells at $2n$; and it is compressed during its travel through the apparatus, while the working-fluid which enters the cells at $2v$ and leaves them at $1n$ is expanded.

A comparison of the U–A diagrams 2a, 2b, 5a, 5b and 6a, 6b pertaining to Figures 2, 5 and 6, respectively, makes it obvious that the pressure-converter is adaptable to a great variety of pressure ratios. Because of this advantage the pressure-converter has a much greater usefulness than the known "pressure-exchanger."

Figure 7:
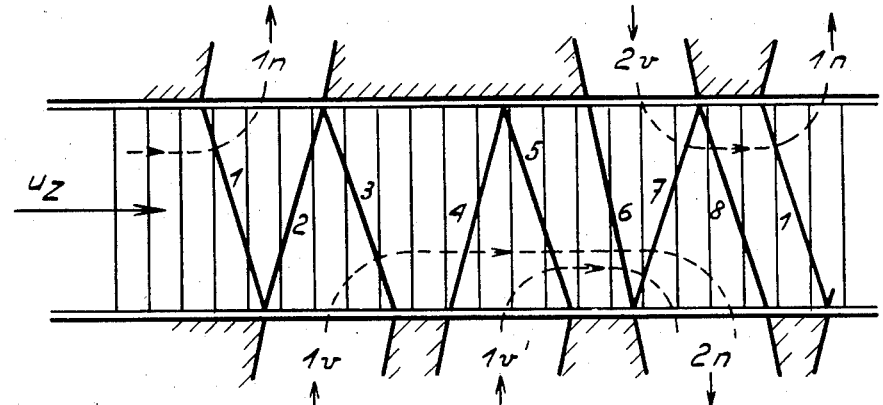
Fig. 7 is a linear development of a cylindrical section through another embodiment.
Figure 7A:
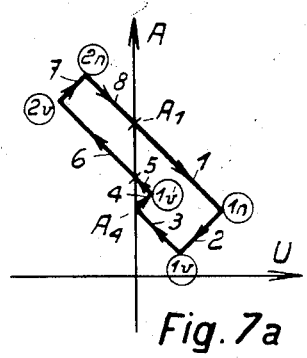
Fig. 7a is a vectorial diagram showing pressure variations in a pressure converter as shown in Fig. 7.
Figure 7B:
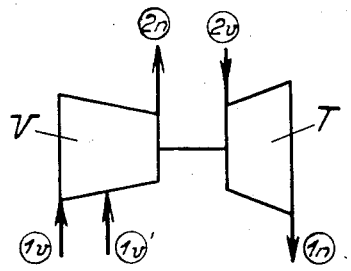
Fig. 7b is a schematic view of a compressor-turbine assembly for comparison with the pressure converter of Fig. 7.

The pressure-converter has still other possible uses in that it can be utilized to compress one or more working-fluids while at the same time, in the same machine, one or more working-fluids are expanded. For this purpose any of the previously described constructions can be modified by the provision of additional chambers for fluid at other pressures. As shown in Fig. 7, for example, the chamber $1v$ for the introduction of a working-fluid is supplemented by a chamber $1v'$ for the same working-fluid at a higher pressure, and both components of this working-fluid are compressed and discharged into the chamber $2n$. At the same time another working-fluid moves through the cells in expanding from the pressure level of chamber $2v$ to that of chamber $1n$. In the case of a conventional assembly of a compressor V driven by a turbine T, as shown in Fig. 7b, the problem would be solved by providing the compressor with separate inlets $1v$ and $1v'$ for the working-fluid of different pressure levels.

Figure 8:
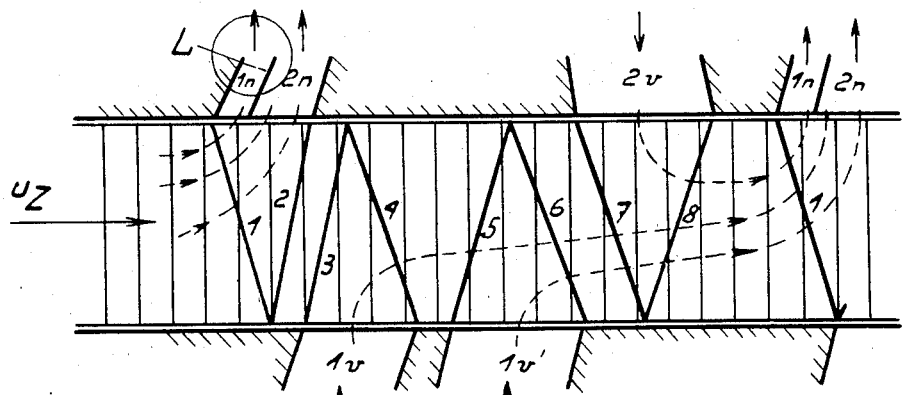
Fig. 8 is a linear development of a cylindrical section through a modified form of pressure converter.
Figure 8A:
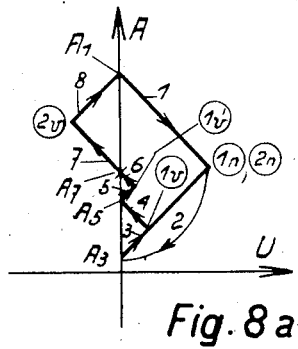
Fig. 8a is a vectorial diagram showing pressure variations in a cell of the Fig. 8 apparatus.
Figure 8B:
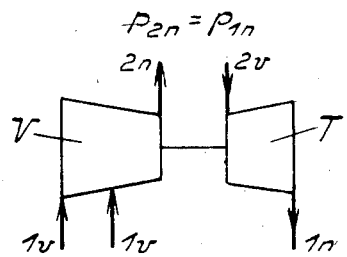
Fig. 8b is a schematic view of a compressor turbine assembly for comparison with the pressure converter of Fig. 8.

In certain similar cases it is unnecessary to arrange additional pressure stages. If, for instance, it is desired to compress the two working-fluids from the pressures $p_{1v}$ and $p_{1v'}$ to the pressure $p_{2n}$, and if the latter is equal to the pressure $p_{1n}$ at which the expanded working-fluid leaves the cells, it is possible to provide a single exit chamber in the pressure-converter, the construction then being as shown in Fig. 8 and the operation being as shown vectorially in Fig. 8a. The two working-fluids with identical terminal pressure level, $p_{2n}=p_{1n}$, will leave the cells at the same control opening which is subdivided only by the guide-wall L. Figure 8b indicates again how this problem would be solved in the case of an ordinary, turbine-driven, compressor assembly.

Figure 9:
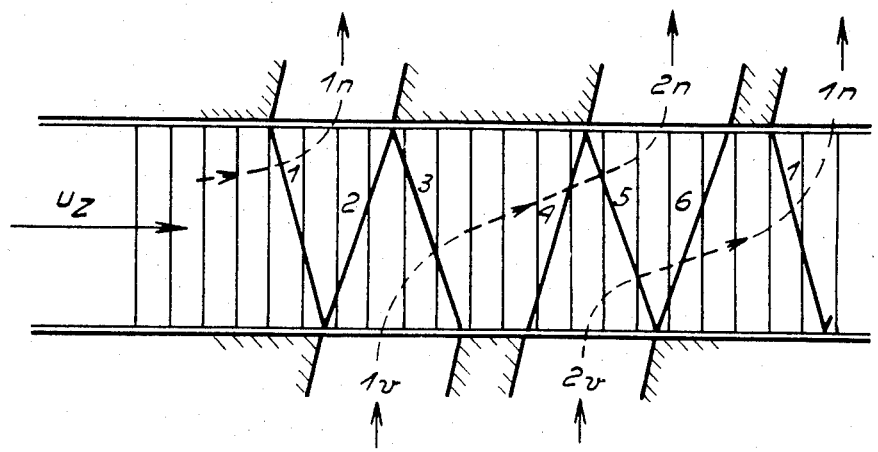
Fig. 9 is a linear development of a cylindrical section through a further modification.
Figure 9A:
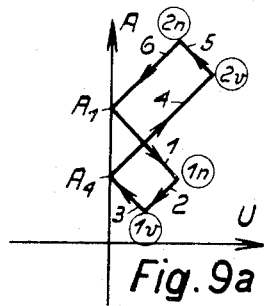
Figs. 9a and 9b are vectorial diagrams showing pressure variations in a cell of the Fig. 9 apparatus.
Figure 9B:
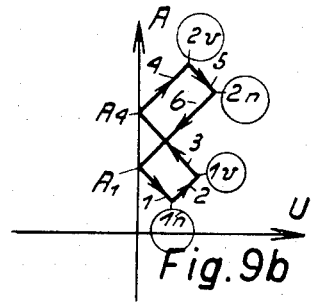

The described pressure converters are constructed in such manner that the working-fluid to be compressed both enters and leaves the cells at one end while the expanded working-fluid enters and leaves at the opposite ends of the cells. If it is desired that the working-fluids enter and leave at opposite ends of the cells, for example in order to simplify the arrangement of the flow line connections of a machine, it is possible to rearrange the flow openings of the control elements of a pressure-converter in the manner illustrated in Figure 9 and the pressure changes then take place according to the vectorial diagrams of Fig. 9a or 9b. In this case the control openings of the control elements are arranged in such manner, that in the course of one or several working cycles at least one of the working-fluids flows through the entire length of the cells in that it is fed into the pressure-converter at one cell-end and withdrawn at the other end. In the case of a pressure-converter constructed according to Figure 8, only the working-fluid to be expanded enters and leaves the cells at the same side of the machine.

I claim:

1. A pressure-converter comprising means establishing a plurality of cells in cylindrical array about an axis, wall means providing pressure chambers for gaseous fluids at the opposite ends of said plurality of cells and under different pressures, said wall means being apertured adjacent each end of said plurality of cells to control the transfer of fluids between the cells and the respective pressure chambers, and means supporting said cells and said apertured wall means for relative rotation to connect said cells in sequence to said pressure chambers to establish pressure waves moving along each cell in sequence thereby to set its contents in motion, the dimensions of said cells and the peripheral lengths and locations of said wall apertures bearing such relation to each other that an end of each cell is opened at the beginning of a pressure wave originating at one end of the cell and is reclosed when the oppositely moving pressure wave arrives at such cell end from the opposite end of the cell.

2. A pressure-converter as recited in claim 1, wherein said pressure chambers include an inlet pressure chamber and an associated outlet pressure chamber at each end of said plurality of cells, and said wall apertures are relatively spaced to connect one end of a cell to said inlet pressure chamber during an interval when the other end of the cell is sealed, whereby a pressure wave traverses the cell and is reflected from said sealed other end, to seal said one end of the cell at substantially the instant that the reflected pressure wave arrives at said one end of the cell, thereby to reflect a pressure wave of opposite sense toward the other end of the cell, and then to open said one end of said cell to said wall associated outlet pressure chamber, the apertures being staggered in relation to each other to open an end of a cell to a pressure chamber at a time when its other end is sealed.

3. A pressure-converter as recited in claim 1, wherein said pressure chambers include an inlet pressure chamber at one end of the cells containing pressure fluid to be expanded and an inlet chamber at the opposite end of the cells containing pressure fluid to be compressed.

4. A pressure-converter as recited in claim 1, wherein said pressure chambers at one end of said cells include an inlet pressure chamber containing a first pressure fluid to be expanded and an outlet pressure chamber for said expanded pressure fluid, and wherein said pressure chambers at the opposite end of said cells include a pair of inlet pressure chambers each containing a second pressure fluid but at different pressure levels to be compressed and an outlet pressure chamber for said second compressed pressure fluid.

5. A pressure-converter as recited in claim 1, wherein said pressure chambers at one end of said cells include an inlet pressure chamber containing a first pressure fluid to be expanded, a first outlet pressure chamber for said expanded pressure fluid and a second outlet pressure chamber adjacent to said first outlet pressure chamber, and wherein said pressure chambers at the opposite end of said cells include a pair of inlet pressure chambers each containing a second pressure fluid but at different pressure levels to be compressed, said second pressure fluid being discharged after passage through said cells through said second outlet pressure chamber.

6. A pressure-converter as recited in claim 1, wherein said pressure chambers include a pair of inlet pressure chambers and an individual outlet pressure chamber for each inlet pressure chamber, each outlet pressure chamber being at the end of said cells opposite its inlet pressure chamber.

7. A pressure-converter as recited in claim 1 wherein said pressure chambers include an inlet pressure chamber and an associated outlet pressure chamber at each end of an opening into said cells and wherein said wall apertures at opposite ends of said cells are located such that each cell is transferred from a connection with a pressure chamber at one end to a connection with a pressure chamber at the other end at substantially the instant of arrival at such other cell end of a pressure wave originating at the opposite end of the cell.

References Cited in the file of this patent

UNITED STATES PATENTS 2,399,394     Seippel     Apr. 30, 1946